(12) United States Patent
Huang (10) Patent No.: US 9,182,547 B2
(45) Date of Patent: Nov. 10, 2015

(54) OPTICAL WAVEGUIDE DIRECTIONAL COUPLER AND METHOD FOR MAKING SAME

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 318 days.

(21) Appl. No.: 13/686,951

(22) Filed: Nov. 28, 2012

(65) Prior Publication Data

US 2013/0322823 A1 Dec. 5, 2013

(51) Int. Cl.
*G02B 6/125* (2006.01)
*G02B 6/136* (2006.01)
*G02B 6/26* (2006.01)
*G02B 6/28* (2006.01)

(52) U.S. Cl.
CPC ............ *G02B 6/125* (2013.01); *G02B 6/136* (2013.01); *G02B 6/26* (2013.01); *G02B 6/2821* (2013.01)

(58) Field of Classification Search
CPC ...................................................... G02B 6/125
See application file for complete search history.

(56) References Cited

U.S. PATENT DOCUMENTS 7,460,579 B2 * 12/2008 Park et al. ................ 372/50.121

* cited by examiner

*Primary Examiner* — Jerry Rahill
(74) *Attorney, Agent, or Firm* — Novak Druce Connolly Bove + Quigg LLP (57) ABSTRACT

An optical waveguide directional coupler includes a base having a planar member and a ridge member and an optical waveguide in the base. The ridge member extends from the planar member and has an upper surface where the optical waveguide exposed. The optical waveguide includes a first flat side surface, a second flat side surface parallel to the first flat side surface, a third flat side surface, a fourth flat side surface parallel to the third flat side surface, and a first flat connection side surface. An included angle θ1 between the first and third flat side surfaces is an obtuse angle, an included acute angle α1 is formed between the first flat connection side surface and the second flat side surface, and θ1 and α1 satisfy α1<(180°−θ1).

13 Claims, 12 Drawing Sheets

OPTICAL WAVEGUIDE DIRECTIONAL COUPLER AND METHOD FOR MAKING SAME

BACKGROUND

1. Technical Field

The present disclosure relates to an optical waveguide directional coupler and a method for making the optical waveguide directional coupler.

2. Description of Related Art

Optical waveguide directional couplers couple light beams of different wavelengths to an optical fiber and divide light from the optical fiber into light beams of different wavelengths.

An optical waveguide directional coupler includes a base and an optical waveguide formed in the base. In order to change the direction of the light beams passing through the optical waveguide, the optical waveguide is designed to be bent with a radius of curvature. However, if the radius of curvature is insufficient, the scatting loss of the light beams increases. If the radius of curvature is excessive, though the scatting loss of the light beams decreases, the length of the optical waveguide increases.

Therefore, it is desirable to provide an optical waveguide directional coupler and a method for making same, which can overcome or alleviate the above-mention problems.

DETAILED DESCRIPTION

Figure 1:
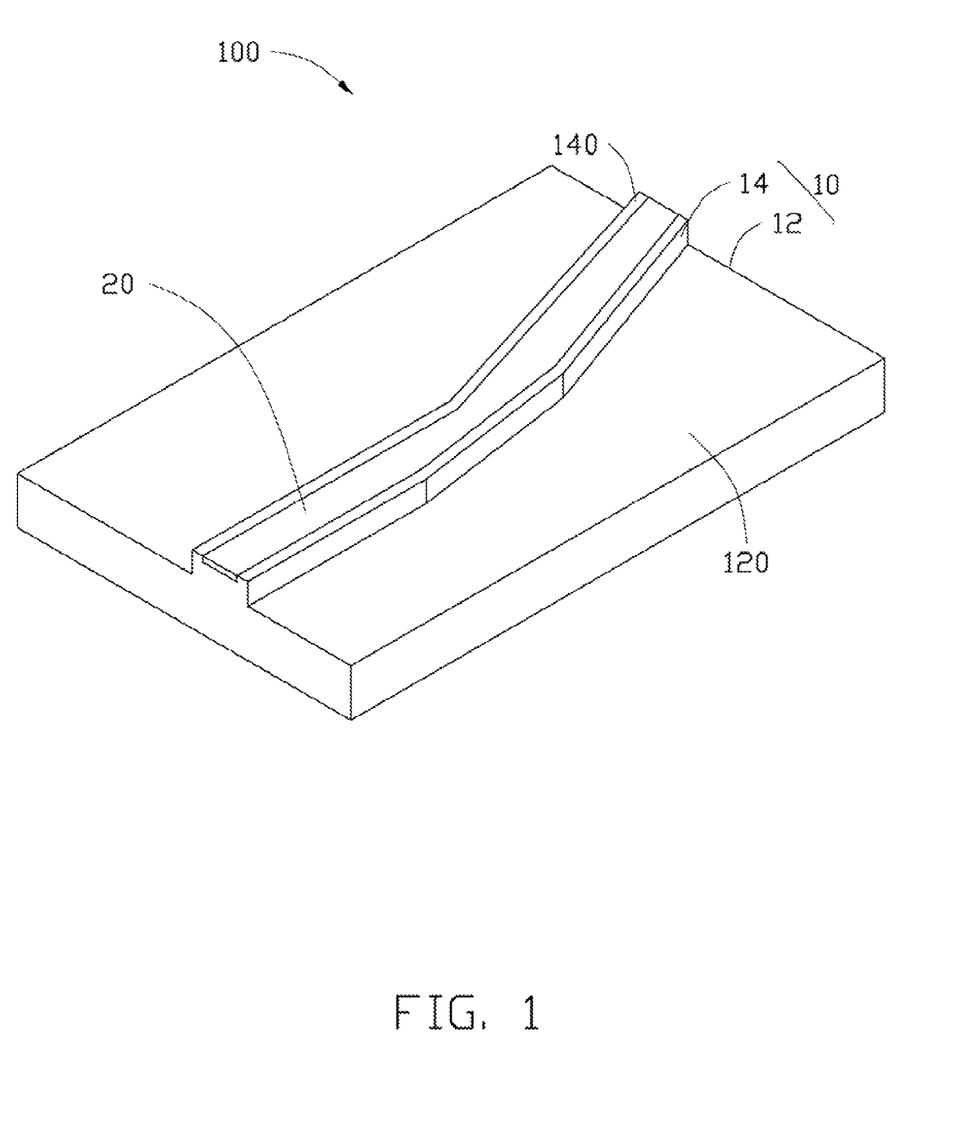
FIG. 1 is a schematic, isometric view of an optical waveguide directional coupler including an optical waveguide, according to a first exemplary embodiment.

FIG. 1 shows a first exemplary embodiment of an optical waveguide directional coupler 100. The optical waveguide directional coupler 100 is rigid-typed and includes a base 10 and an optical waveguide 20 formed in the base 10.

The base 10 includes a planar member 12 and a raised elongated ridge member 14. The planar member 12 is a plate and includes a planar top surface 120. The ridge member 14 upwardly and perpendicularly extends from the top surface 120 and includes a planar upper surface 140.

The optical waveguide 20 is embedded in the ridge member 14 and exposed at the upper surface 140. The optical waveguide 20 extends through the ridge member 14 along a lengthwise direction of the ridge member 14. Distal ends of the optical waveguide 20 are exposed at opposite end surfaces of the ridge member 14. In this embodiment, the optical waveguide 20 is made of a material selected from a group consisting of titanium, zinc and nickel.

Figure 2:
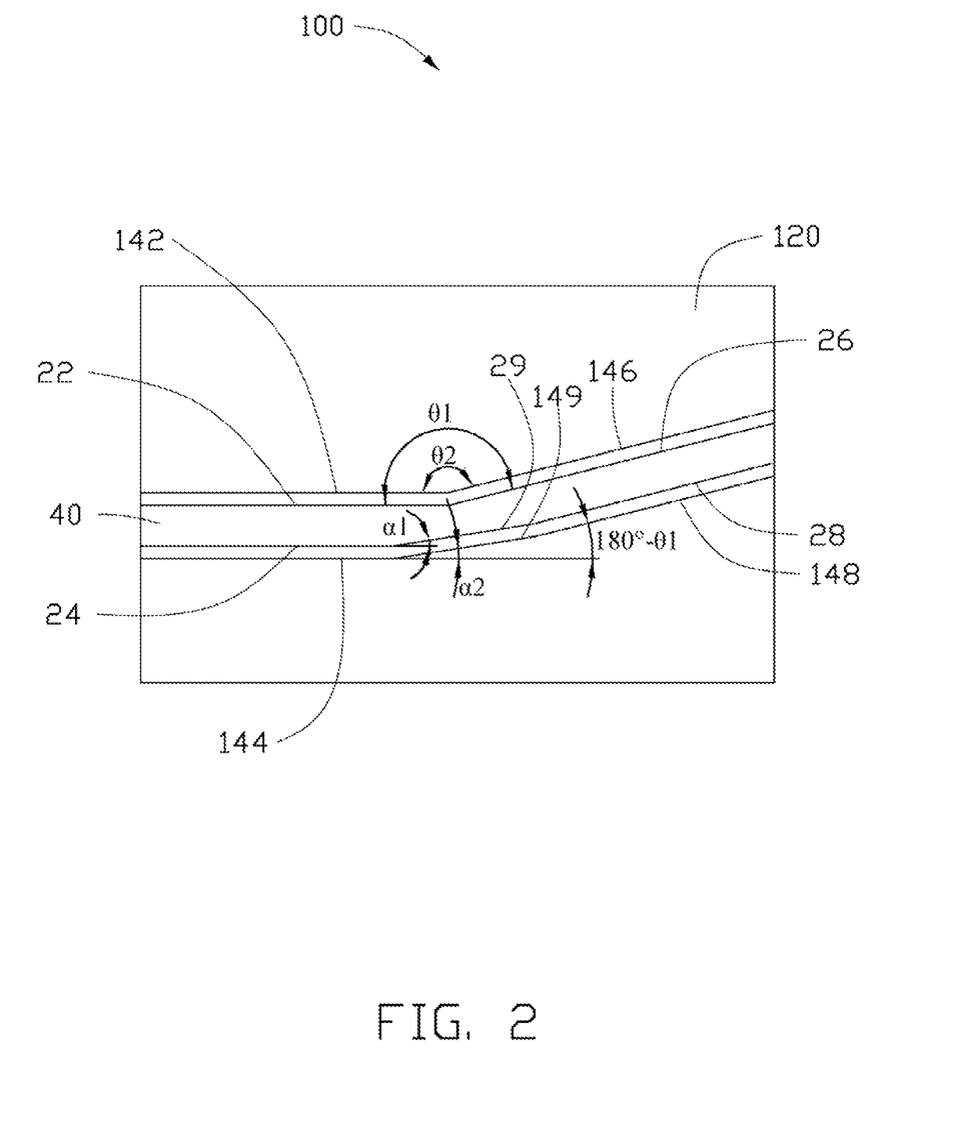
FIG. 2 is a planar view of the optical waveguide directional coupler of FIG. 1.

Referring to FIG. 2, the optical waveguide 20 includes a first flat side surface 22, a second flat side surface 24, a third flat side surface 26, a fourth flat side surface 28, and a first flat connection side surface 29. The first flat side surface 22 is parallel to and opposite to the second flat side surface 24. The third flat side surface 26 is parallel to the fourth flat side surface 28. The first flat side surface 22 directly connects the third flat side surface 26, and an included angle θ1 between the first flat side surface 22 and the third flat side surface 26 is an obtuse angle. The first flat connection side surface 29 interconnects the second flat side surface 24 and the fourth flat side surface 28, and an included acute angle α1 is formed between a main plane of the first flat connection side surface 29 and a main plane of the second flat side surface 24. The included angle θ1 and the included angle α1 satisfy the following formula: α1<(180°−θ1).

Figure 3:
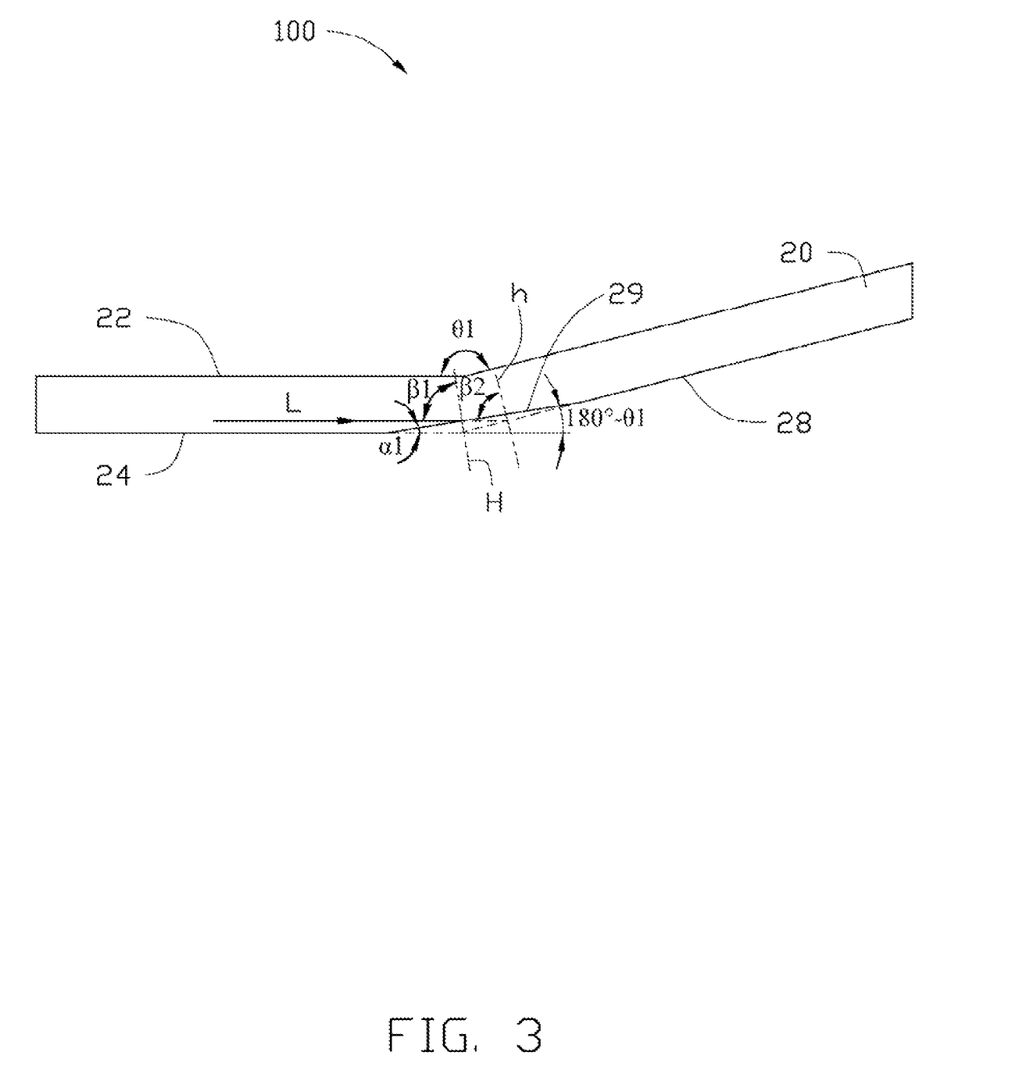
FIG. 3 is a schematic view of a light path of the optical waveguide of FIG. 1.

Referring to FIG. 3, when in use, a light beam L parallel to the first flat side surface 22 enters the optical waveguide 20, and is reflected by the first flat connection side surface 29, and then transmits ahead, and finally emits from the optical waveguide 20. When the light beam L impinges on the first flat connection side surface 29, the incident angle of the light beam L is β1. If the first flat connection side surface 29 is omitted, and the second flat side surface 24 directly connects the fourth flat side surface 28 (the dash lines show), the light beam L will impinge on the fourth flat side surface 28, and the incident angle of the light beam L is β2. Wherein β1=90°−α1, β2=90°−(180°−θ1), and β1−β2=90°−α1−90°+(180°−θ1)=180°−θ1−α1, as a result, β1−β2>0 due to formula α1<(180°−θ1). Thus, the incident angle β1 of the light beam L impinging on the first flat connection side surface 29 is bigger than the incident angle β2 of the light beam L impinging on the fourth flat side surface 28, and more light beams entering the optical waveguide 20 are totally reflected by the first flat connection side surface 29. Therefore, the scatting loss of the light beams is reduced, and increasing the length of the optical waveguide 20 is avoided.

In this embodiment, in order to further reduce the scatting loss of the light beams, the shape of the ridge member 14 conforms to that of the optical waveguide 20. In detail, referring to FIG. 2, the ridge member 14 includes a first sidewall 142, a second sidewall 144, a third sidewall 146, a fourth sidewall 148, and a first connection sidewall 149. The first sidewall 142 is parallel to the second sidewall 144 and the first flat side surface 22. The third sidewall 146 is parallel to the fourth sidewall 148 and the third flat side surface 26. The first sidewall 142 directly connects the third sidewall 146, and an included angle θ2 between the first sidewall 142 and the third sidewall 146 is an obtuse angle. The first connection sidewall 129 is parallel to the first flat connection side surface 29 and interconnects the second sidewall 144 and the fourth sidewall 148, and an acute included angle α2 is formed between a main plane of the first connection sidewall 149 and a main plane of the second sidewall 144. The included angle θ2 is equal to the included angle θ1, and the included angle α2 is equal to the included angle α1. Therefore, the included angle θ2 and the included angle α2 satisfy the following formula: α2<(180°−θ2).

Figure 4:
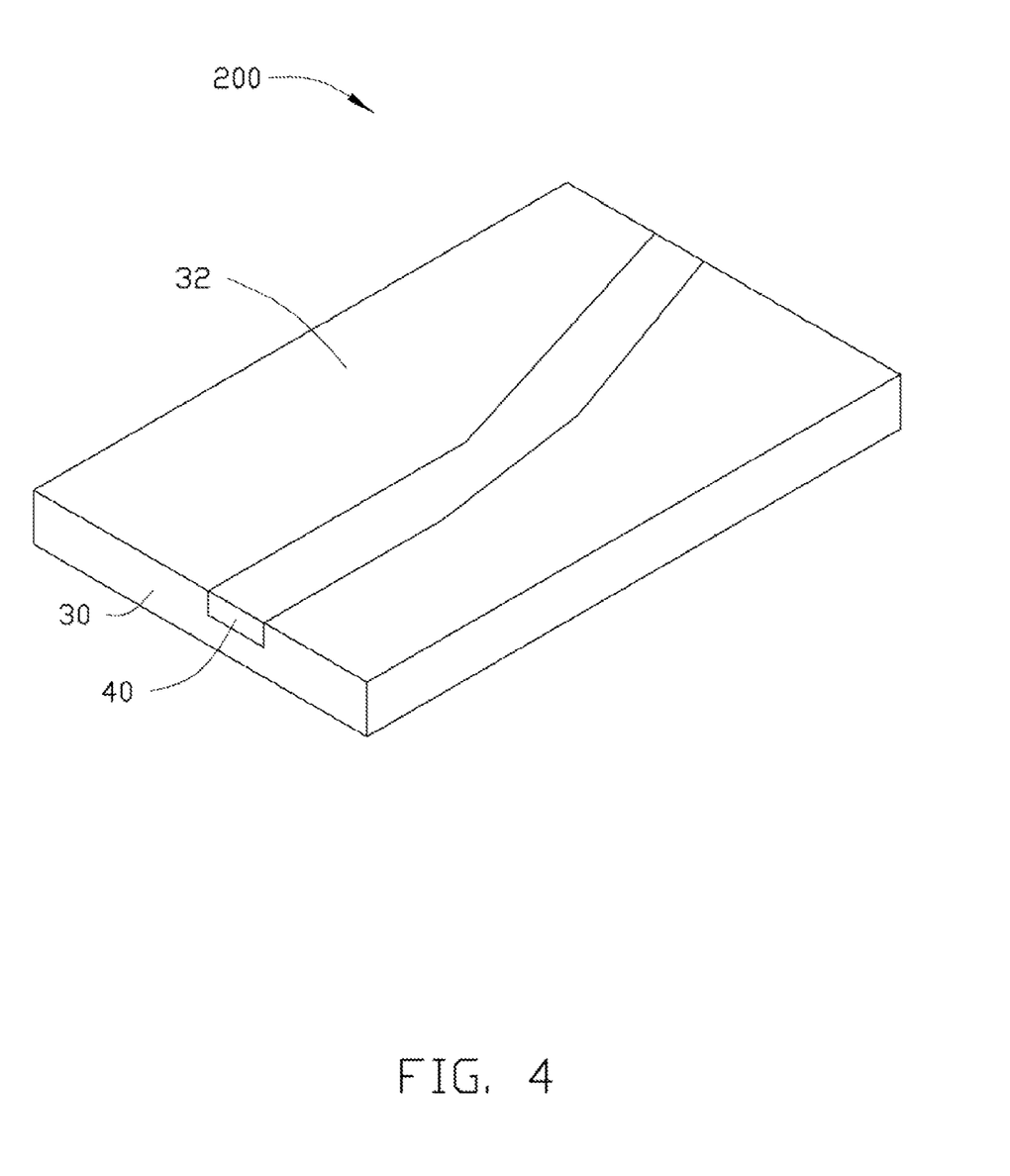
FIG. 4 is a schematic, isometric view of an optical waveguide directional coupler, according to a second exemplary embodiment.

Referring to FIG. 4, an optical waveguide directional coupler 200, according to a second exemplary embodiment, is shown. The difference between the optical waveguide directional coupler 200 of this embodiment and the optical waveguide directional coupler 100 of the first embodiment is that the optical waveguide directional coupler 200 is planar-typed. The base 30 is a planar plate and the ridge member 14 is omitted. The base 30 includes a first surface 32. The optical waveguide 40 is embedded in the base 30 and is exposed at the first surface 32. One end of the optical waveguide 40 is exposed at an end surface of the base 30, and the other end of the optical waveguide 40 is exposed at the other end surface of the base 30.

Figure 5:
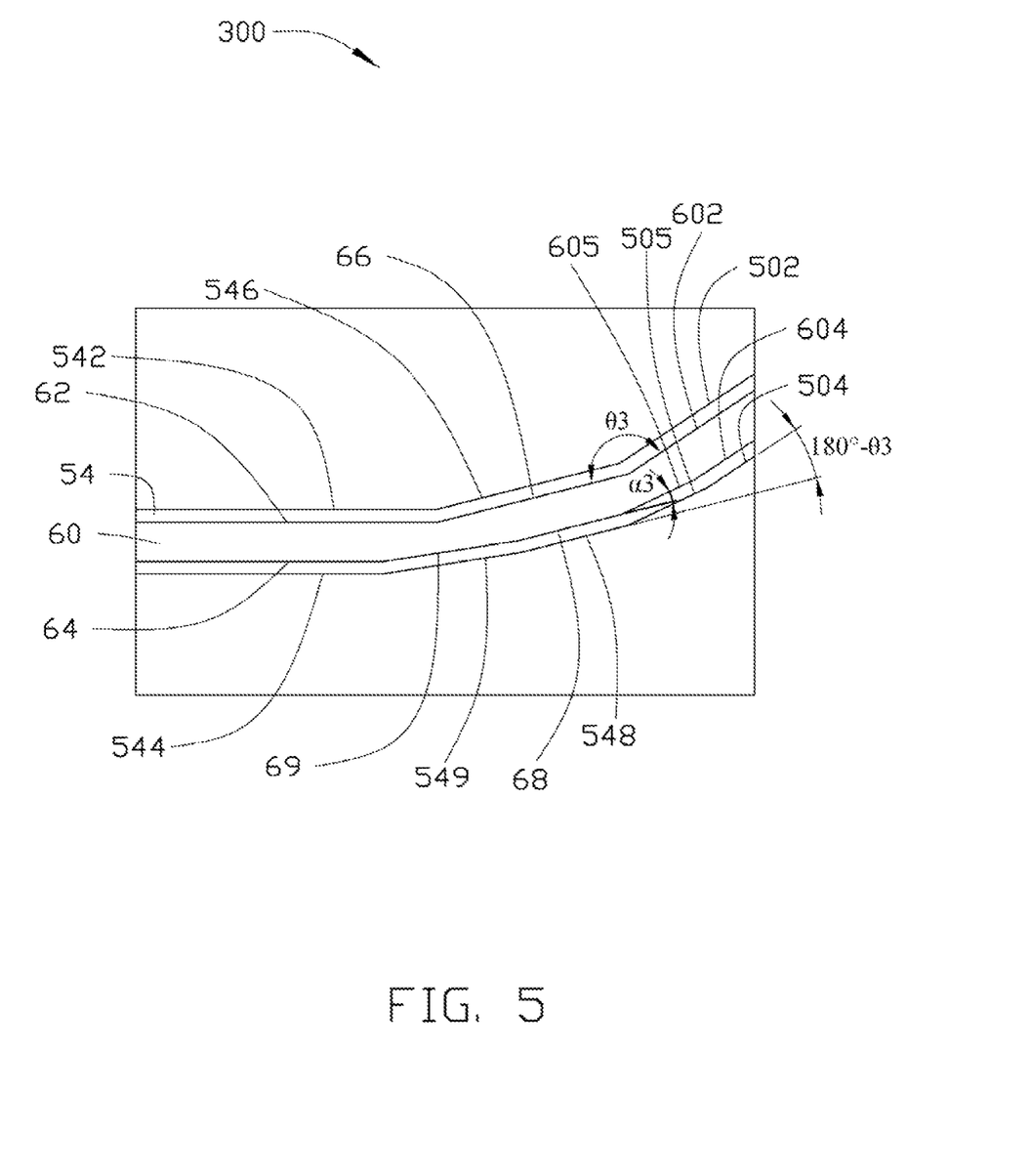
FIG. 5 is a planar view of an optical waveguide directional coupler, according to a third exemplary embodiment.

Referring to FIG. 5, an optical waveguide directional coupler 300, according to a third exemplary embodiment, is shown. The differences between the optical waveguide directional coupler 300 of this embodiment and the optical waveguide directional coupler 100 of the first embodiment are that the optical waveguide 60 further includes a fifth flat side surface 602, a sixth flat side surface 604, and a second flat connection side surface 605. The first flat side surface 62, the third flat side surface 66, and the fifth flat side surface 602 are connected in sequence. The second flat side surface 64, the first flat connection side surface 69, the fourth flat side surface 68, the second flat connection side surface 605, and the sixth flat side surface 604 are connected in sequence. In detail, the fifth flat side surface 602 is parallel to the sixth flat side surface 604. The fifth flat side surface 602 directly connects the third flat side surface 66, and an included angle θ3 between the third flat side surface 66 and the fifth flat side surface 602 is an obtuse angle. The second flat connection side surface 605 interconnects the fourth flat side surface 68 and the sixth flat side surface 604, and an acute included angle α3 is formed between the second flat connection side surface 605 and the fourth flat side surface 68. The included angle θ3 and the included angle α3 satisfy the following formula: α3<(180°−θ3). In this embodiment, the included angle θ3 is equal to the included angle θ1 (see FIG. 2), and the included angle α3 is equal to the included angle α1 (see FIG. 2). In other embodiment, the included angle θ3 may be not equal to the included angle θ3, and the included angle α3 may be not equal to the included angle α1.

The shape of the ridge member 54 conforms to the shape of the optical waveguide 60. In detail, the ridge member 54 further includes a fifth sidewall 502, a sixth sidewall 504, and a second connection sidewall 505. The fifth sidewall 502 adjoins the third sidewall 546. That is, the first sidewall 542, the third sidewall 546, and the fifth sidewall 502 are connected in sequence. The second connection sidewall 505 is interconnected between the fourth sidewall 548 and the sixth sidewall 504. That is, the second sidewall 544, the first connection sidewall 549, the fourth sidewall 548, the second connection sidewall 505, and the sixth sidewall 504 are connected in sequence. The fifth sidewall 502 is parallel to the fifth flat side surface 602. The sixth sidewall 504 is parallel to the sixth flat side surface 604. The second connection sidewall 505 is parallel to the second flat connection side surface 605.

Advantages of the optical waveguide directional coupler 200 of the second embodiment and the optical waveguide directional coupler 300 of the third embodiment are similar to those of the optical waveguide directional coupler 100 of the first embodiment. The optical waveguide directional coupler 300 can further reduce the scatting loss of light because the optical waveguide directional coupler 300 further includes the fifth flat side surface 602, the sixth flat side surface 604, and the second flat connection side surface 605.

Referring to FIGS. 6-10, a method for making the optical waveguide directional coupler 100, according to a fourth exemplary embodiment, is shown. The method includes the following steps.

Figure 6:
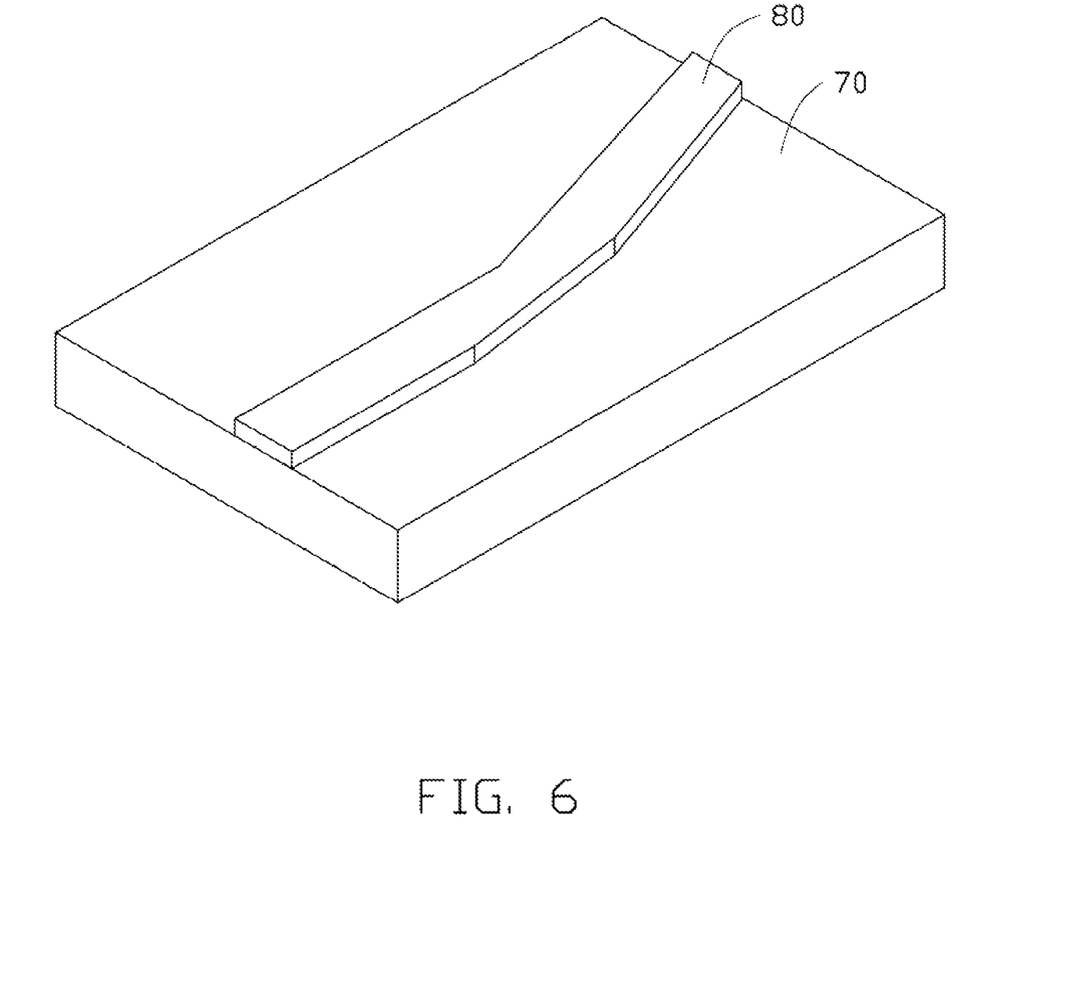
FIGS. 6-12 show steps of a method for making the optical waveguide directional coupler of FIG. 1, according to a fourth exemplary embodiment.

First, referring to FIG. 6, a substrate 70 and a first mask 80 are provided. Specifically, the substrate 70 is a planar plate. The first mask 80 has a shape conforming to the ridge member 14 of the first embodiment. In this embodiment, the substrate 70 is made of a material selected from a group consisting of lithium niobate and barium niobate.

Figure 7:
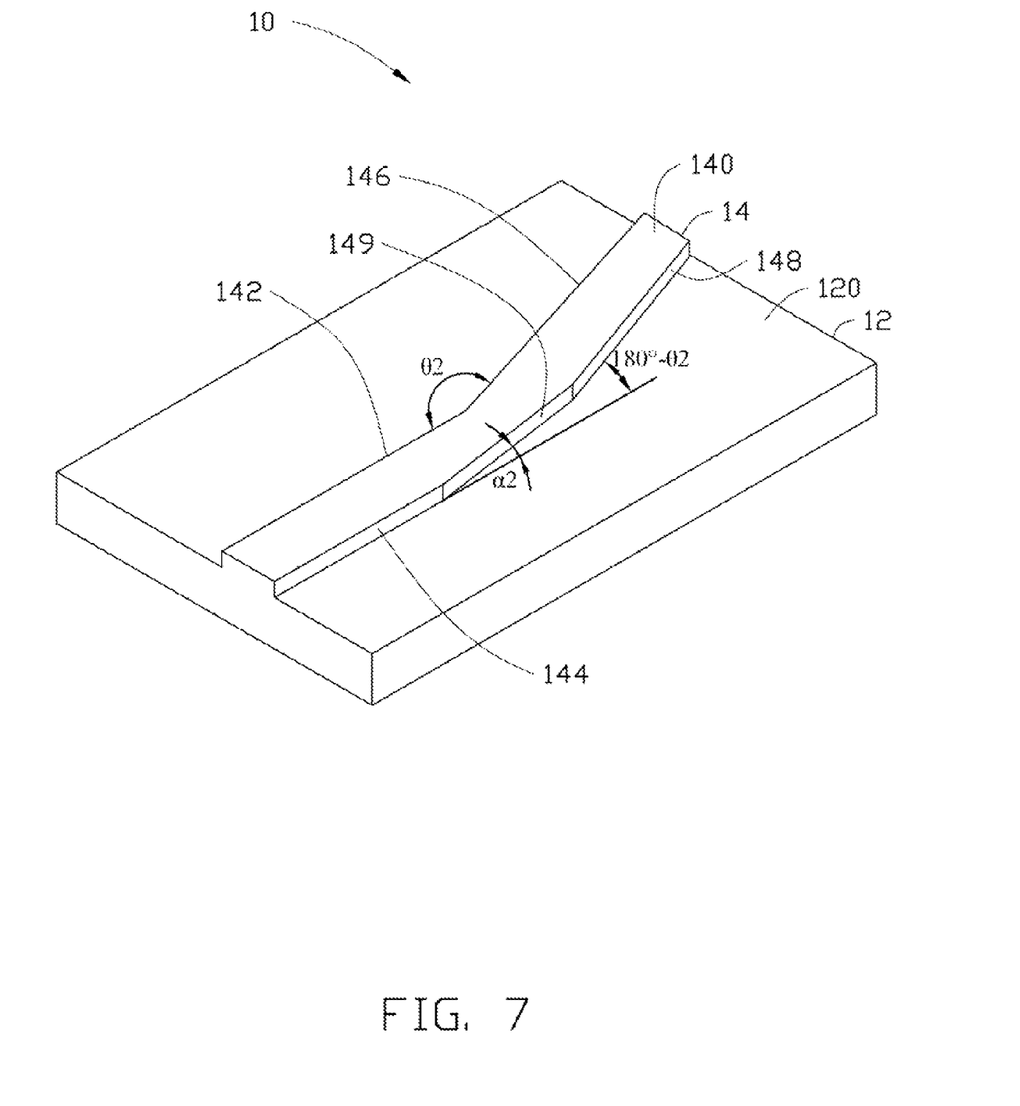

Second, referring to FIG. 7, a base 10 is obtained by etching the substrate 70 to remove portions of the substrate 70 to obtain the base 10 using the first mask 80. In detail, the substrate 70 of 3-4 μm thickness uncovered by the first mask 80 is removed. The base 10 includes a planar member 12 and a raised elongated ridge member 14. The planar member 12 is a plate and includes a planar top surface 120. The ridge member 14 extends from the top surface 120 and includes a planar upper surface 140. The ridge member 14 includes a first sidewall 142, a second sidewall 144, a third sidewall 146, a fourth sidewall 148, and a first connection sidewall 149. The first sidewall 142 is parallel to the second sidewall 144. The third sidewall 146 is parallel to the fourth sidewall 148. The first sidewall 142 directly connects the third sidewall 146, and an included angle θ2 between the first sidewall 142 and the third sidewall 146 is an obtuse angle. The first connection sidewall 129 interconnects the second sidewall 144 and the fourth sidewall 148, and an acute included angle α2 is formed between a main plane of the first connection sidewall 149 and a main plane of the second sidewall 144. The included angle θ2 and the included angle α2 satisfy the following formula: α2<(180°−θ2). To increase the etching speed, the etching solution is composed of HF and HNO$_3$ having a molar ratio of 1:2.

Figure 8:
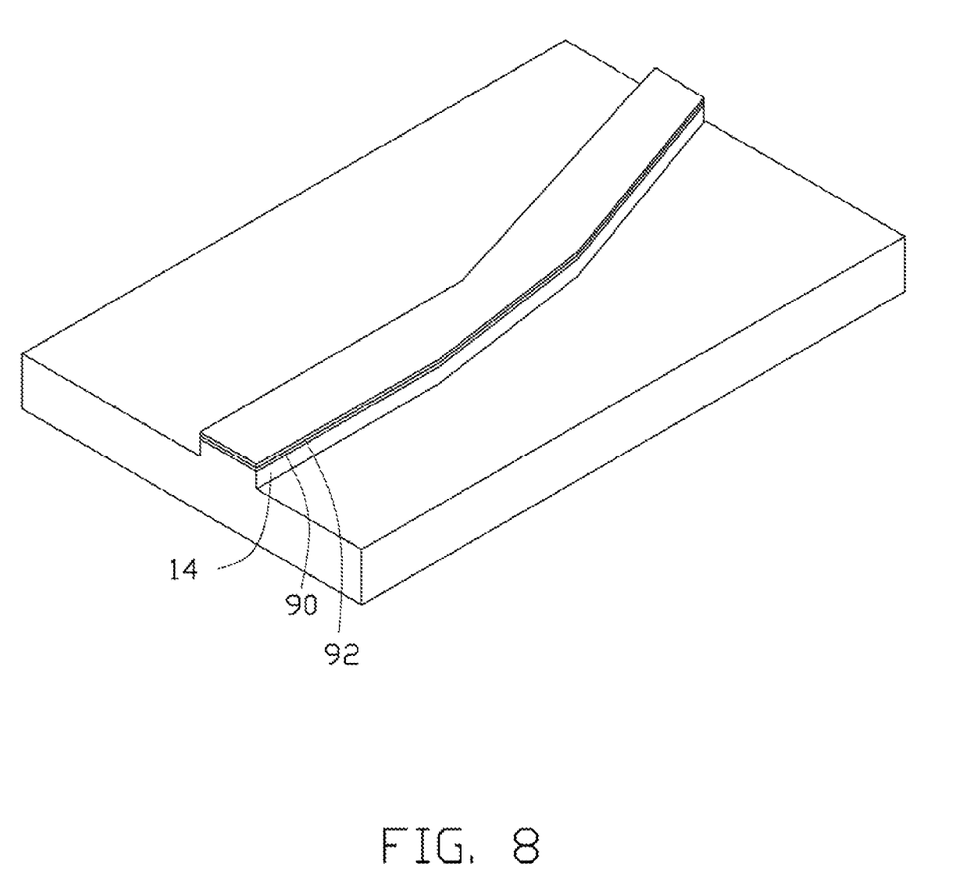

Third, referring to FIG. 8, a light guiding layer 90 is formed on the entire upper surface 140. The light guiding layer 90 includes a central portion and lateral unwanted portions at opposite sides of the central portion. In this embodiment, the light guiding layer 90 is made of a material selected from a group consisting of titanium, zinc and nickel, and the thickness of the light guiding layer 40 is in a range from 0.6 μm to 0.8 μm.

Fourth, referring to FIG. 8, a photo-resist layer 92 is formed on the entire light guiding layer 90.

Figure 9:
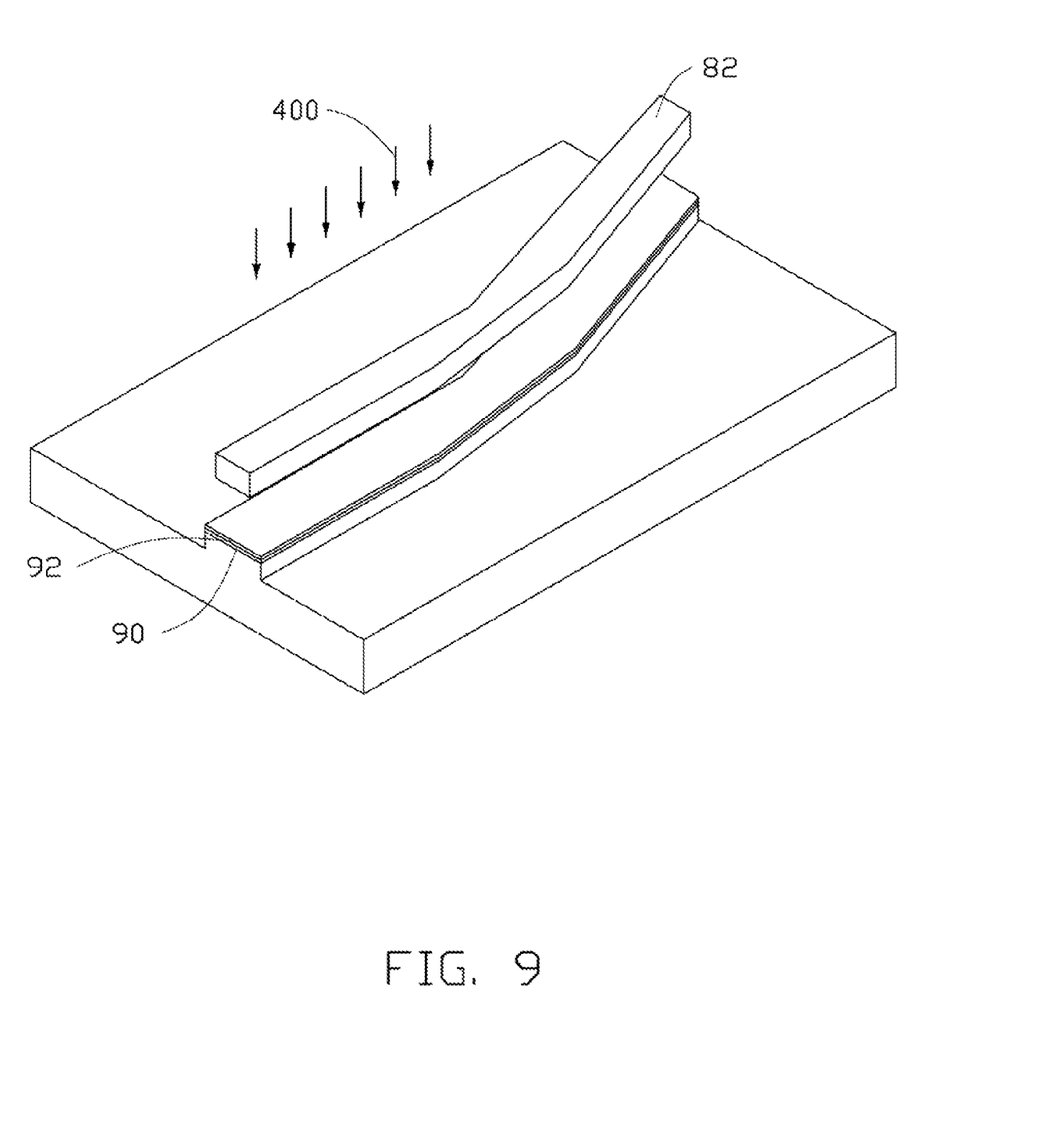
Figure 10:
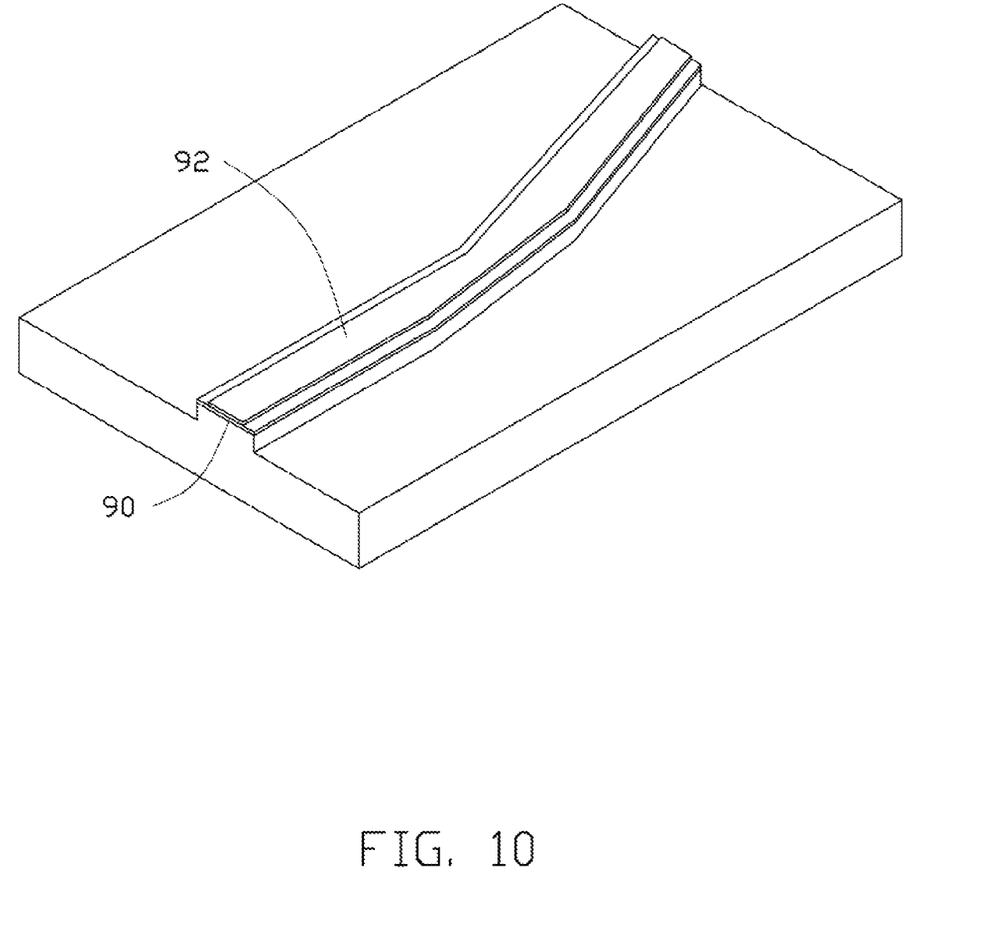

Fifth, referring to FIG. 9-10, a photo-resist layer 92 is processed so as to remove portions thereof to expose the lateral unwanted portions. In detail, a second mask 82 having a shape conforming to the optical waveguide 20 is placed over the photo-resist layer 92. Then, the photo-resist layer 92 is exposed at light beams 400 using the second mask 82. The photo-resist layer 92 is developed, thereby obtaining a photo-resist layer 92 having a shape conforming to the optical waveguide 20 on the light guiding layer 90

Sixth, referring to FIGS. 9-10, the light guiding layer 90 is etched to remove the lateral unwanted portions. That is, the light guiding layer 90 has a shape conforming to the optical waveguide 20.

Seventh, the processed photo-resist layer 92 is removed.

Figure 11:
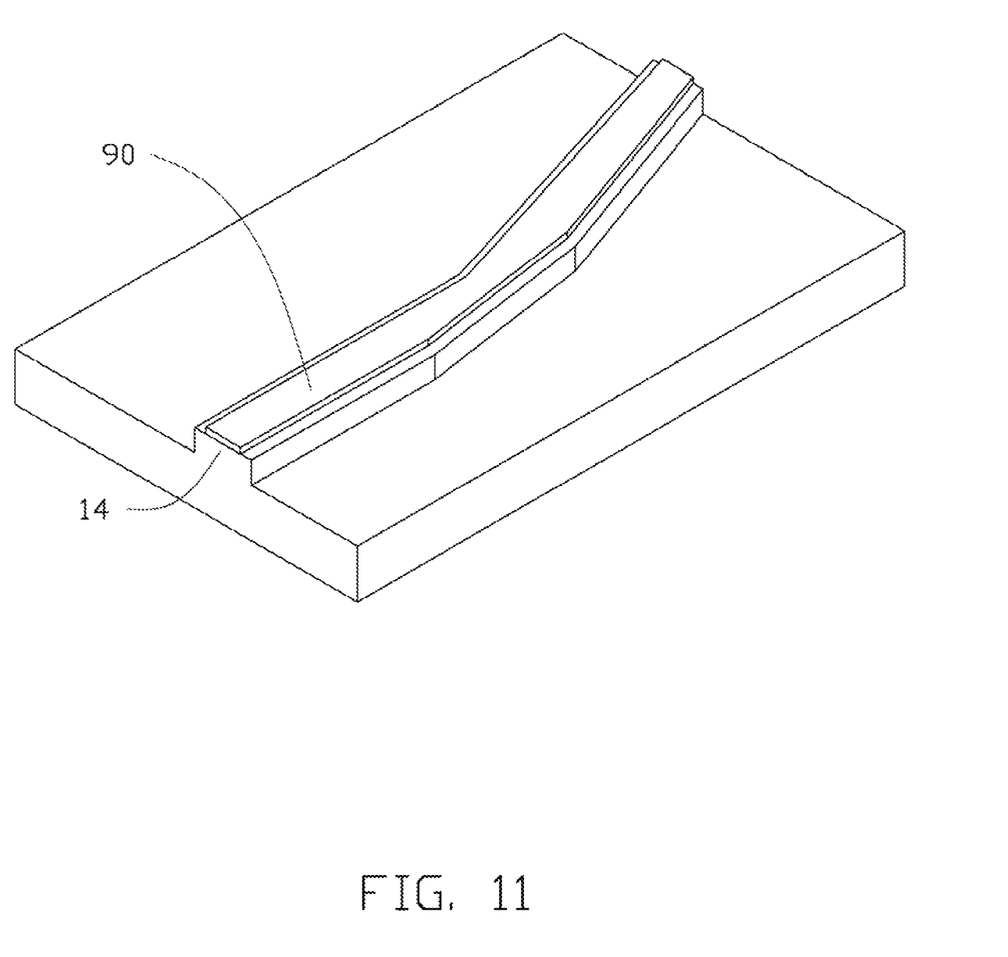
Figure 12:
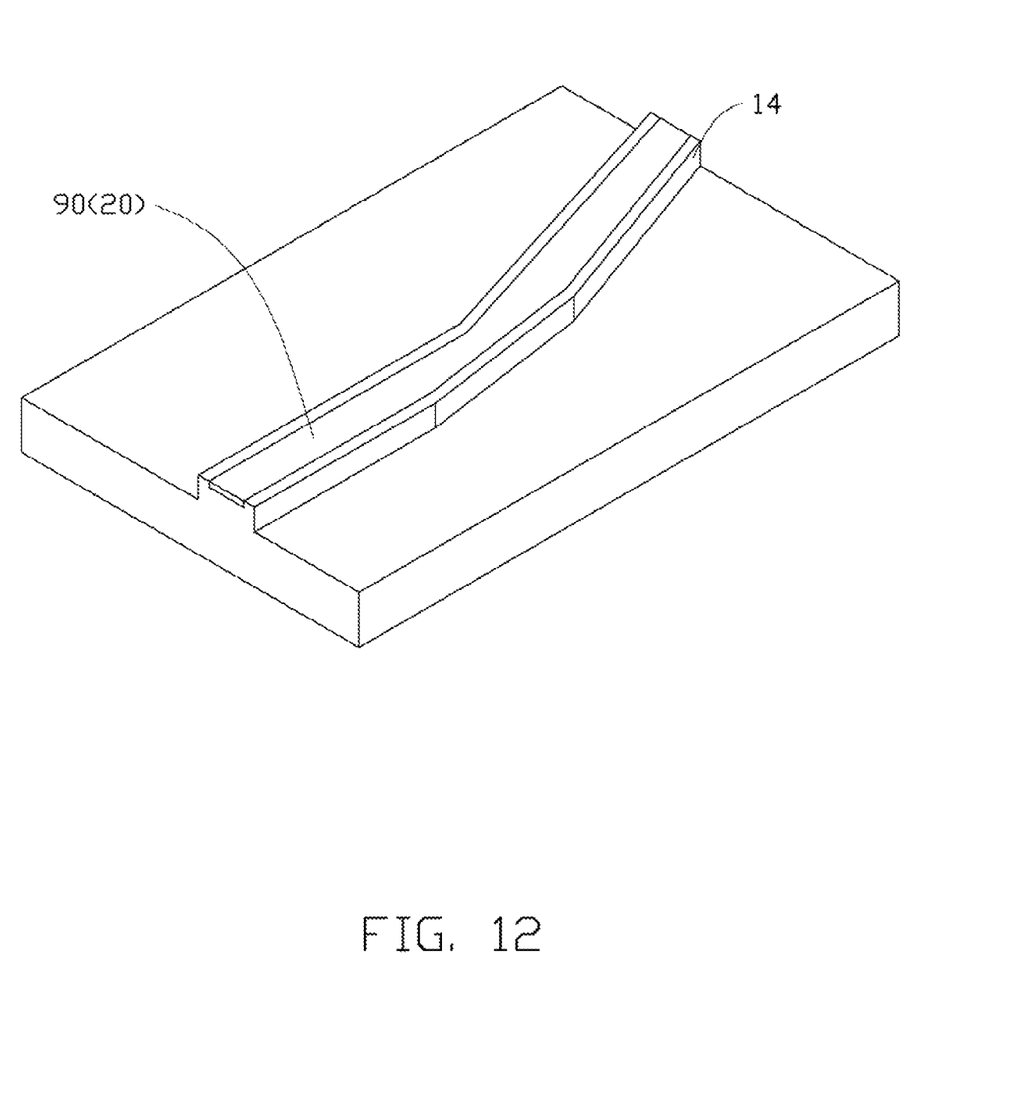

Eighth, referring to FIGS. 11-12, the base 10 and the etched light guiding layer 90 are heated to diffuse the etched light guiding layer 90 into the base 10, thereby the optical waveguide directional coupler 100 with the optical waveguide 20 (shown in FIG. 1) is achieved.

The method for making the optical waveguide directional coupler 100 can achieve an optical waveguide directional coupler 100 with a reduced light scattering loss.

It is to be understood that methods for making the optical waveguide directional couplers 200 and 300 can refer to the method for making the optical waveguide directional coupler 100.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An optical waveguide directional coupler comprising:
   a base comprising a planar member and a raised elongated ridge member, the ridge member extending upwardly from the planar member and having a planar upper surface, a material of the ridge member being the same as a material of the planar member; and
   an optical waveguide formed in the base and exposed at the upper surface, the optical waveguide extending through the ridge member along a lengthwise direction of the ridge member, distal ends of the optical waveguide exposed at opposite end surfaces of the ridge member, the optical waveguide comprising a first flat side surface, a second flat side surface, a third flat side surface, a fourth flat side surface, and a first flat connection side surface, the first flat side surface adjoining the third flat side surface, the first flat connection side surface interconnected between the second flat side surface and the fourth flat side surface, the first flat side surface being parallel to the second flat side surface, the third flat side surface being parallel to the fourth flat side surface, an included angle $\theta 1$ between the first flat side surface and the third flat side surface being an obtuse angle, an included acute angle $\alpha 1$ being formed between a main plane of the first flat connection side surface and a main plane of the second flat side surface, and the included angle $\theta 1$ and the included angle $\alpha 1$ satisfying the following formula: $\alpha 1 < (180° - \theta 1)$.

2. The optical waveguide directional coupler as claimed in claim 1, wherein the optical waveguide further comprises a fifth flat side surface, a sixth flat side surface parallel to the fifth flat side surface and a second flat connection side surface, the third flat side surface adjoins the fifth flat side surface, the second flat connection side surface is interconnected between the fourth flat side surface and the sixth flat side surface, an included angle $\theta 3$ between the third flat side surface and the fifth flat side surface is an obtuse angle, an included acute angle $\alpha 3$ is formed between a main plane of the second flat connection side surface and a main plane of the fourth flat side surface, and the included angle $\theta 3$ and the included angle $\alpha 3$ satisfy the following formula: $\alpha 3 < (180° - \theta 3)$.

3. The optical waveguide directional coupler as claimed in claim 2, wherein the included angle $\theta 3$ is equal to the included angle $\theta 1$, and the included angle $\alpha 3$ is equal to the included angle $\alpha 1$.

4. The optical waveguide directional coupler as claimed in claim 1, wherein the shape of the ridge member conforms to the shape of the optical waveguide.

5. The optical waveguide directional coupler as claimed in claim 2, wherein the ridge member comprises a first sidewall, a second sidewall, a third sidewall, a fourth sidewall, and a first connection sidewall, the first sidewall adjoins the third sidewall, the first connection sidewall is interconnected between the second sidewall and the fourth sidewall, the first sidewall is parallel to the second sidewall and the first flat side surface, the third sidewall is parallel to the fourth sidewall and the third flat side surface, an included angle $\theta 2$ between the first sidewall and the third sidewall is an obtuse angle, an included acute angle $\alpha 2$ is formed between a main plane of the first connection sidewall and a main plane of the second sidewall, and the included angle $\theta 2$ and the included angle $\alpha 2$ satisfy the following formula: $\alpha 2 < (180° - \theta 2)$.

6. The optical waveguide directional coupler as claimed in claim 5, wherein the included angle $\theta 2$ is equal to the included angle $\theta 1$, and the included angle $\alpha 2$ is equal to the included angle $\alpha 1$.

7. The optical waveguide directional coupler as claimed in claim 5, wherein the ridge member further comprises a fifth sidewall, a sixth sidewall and a second connection sidewall, the third sidewall adjoins the fifth sidewall, the second connection sidewall is interconnected between the fourth sidewall and the sixth sidewall, the fifth sidewall is parallel to the fifth flat side surface, the sixth sidewall is parallel to the sixth flat side surface, and the second connection sidewall is parallel to the second flat connection side surface.

8. An optical waveguide directional coupler comprising:
   a base comprising a planar member and a raised elongated ridge member, the ridge member extending upwardly from the planar member and having a planar upper surface; and
   an optical waveguide formed in the base and exposed at the upper surface, the optical waveguide extending through the ridge member along a lengthwise direction of the ridge member, distal ends of the optical waveguide exposed at opposite end surfaces of the ridge member, the optical waveguide comprising a first flat side surface, a second flat side surface, a third flat side surface, a fourth flat side surface, and a first flat connection side surface, the first flat side surface adjoining the third flat side surface, the first flat connection side surface interconnected between the second flat side surface and the fourth flat side surface, the first flat side surface being parallel to the second flat side surface, the third flat side surface being parallel to the fourth flat side surface, an included angle $\theta 1$ between the first flat side surface and the third flat side surface being an obtuse angle, an included acute angle $\alpha 1$ being formed between a main plane of the first flat connection side surface and a main plane of the second flat side surface, and the included angle $\theta 1$ and the included angle $\alpha 1$ satisfying the following formula: $\alpha 1 < (180° - \theta 1)$, wherein the optical waveguide further comprises a fifth flat side surface, a sixth flat side surface parallel to the fifth flat side surface and a second flat connection side surface, the third flat side surface adjoins the fifth flat side surface, the second flat connection side surface is interconnected between the fourth flat side surface and the sixth flat side surface, an included angle $\theta 3$ between the third flat side surface and the fifth flat side surface is an obtuse angle, an included acute angle $\alpha 3$ is formed between a main plane of the second flat connection side surface and a main plane of the fourth flat side surface, and the included angle $\theta 3$ and the included angle $\alpha 3$ satisfy the following formula: $\alpha 3 < (180° - \theta 3)$.

9. The optical waveguide directional coupler as claimed in claim 8, wherein the ridge member comprises a first sidewall, a second sidewall, a third sidewall, a fourth sidewall, and a first connection sidewall, the first sidewall adjoins the third sidewall, the first connection sidewall is interconnected between the second sidewall and the fourth sidewall, the first sidewall is parallel to the second sidewall and the first flat side surface, the third sidewall is parallel to the fourth sidewall and the third flat side surface, an included angle $\theta 2$ between the first sidewall and the third sidewall is an obtuse angle, an included acute angle $\alpha 2$ is formed between a main plane of the first connection sidewall and a main plane of the second sidewall, and the included angle $\theta 2$ and the included angle $\alpha 2$ satisfy the following formula: $\alpha 2 < (180° - \theta 2)$.

10. The optical waveguide directional coupler as claimed in claim 9, wherein the included angle $\theta 2$ is equal to the included angle $\theta 1$, and the included angle $\alpha 2$ is equal to the included angle $\alpha 1$.

11. The optical waveguide directional coupler as claimed in claim 9, wherein the ridge member further comprises a fifth sidewall, a sixth sidewall and a second connection sidewall, the third sidewall adjoins the fifth sidewall, the second connection sidewall is interconnected between the fourth sidewall and the sixth sidewall, the fifth sidewall is parallel to the fifth flat side surface, the sixth sidewall is parallel to the sixth flat side surface, and the second connection sidewall is parallel to the second flat connection side surface.

12. The optical waveguide directional coupler as claimed in claim 8, wherein the included angle $\theta 3$ is equal to the included angle $\theta 1$, and the included angle $\alpha 3$ is equal to the included angle $\alpha 1$.

13. The optical waveguide directional coupler as claimed in claim 8, wherein the shape of the ridge member conforms to the shape of the optical waveguide.

* * * * *